Nov. 3, 1942.  J. D. RUSSELL  2,301,146
STEERING MECHANISM
Original Filed March 12, 1941  2 Sheets-Sheet 1

INVENTOR.
John D. Russell
BY Harold W. Hawkins
ATTORNEY

Nov. 3, 1942.  J. D. RUSSELL  2,301,146
STEERING MECHANISM
Original Filed March 12, 1941   2 Sheets-Sheet 2
Fig. 4
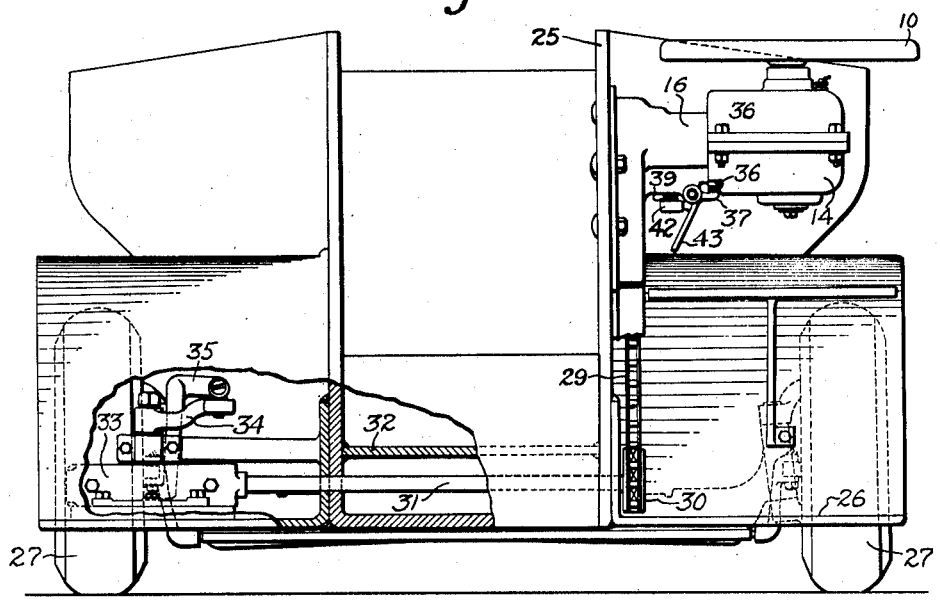
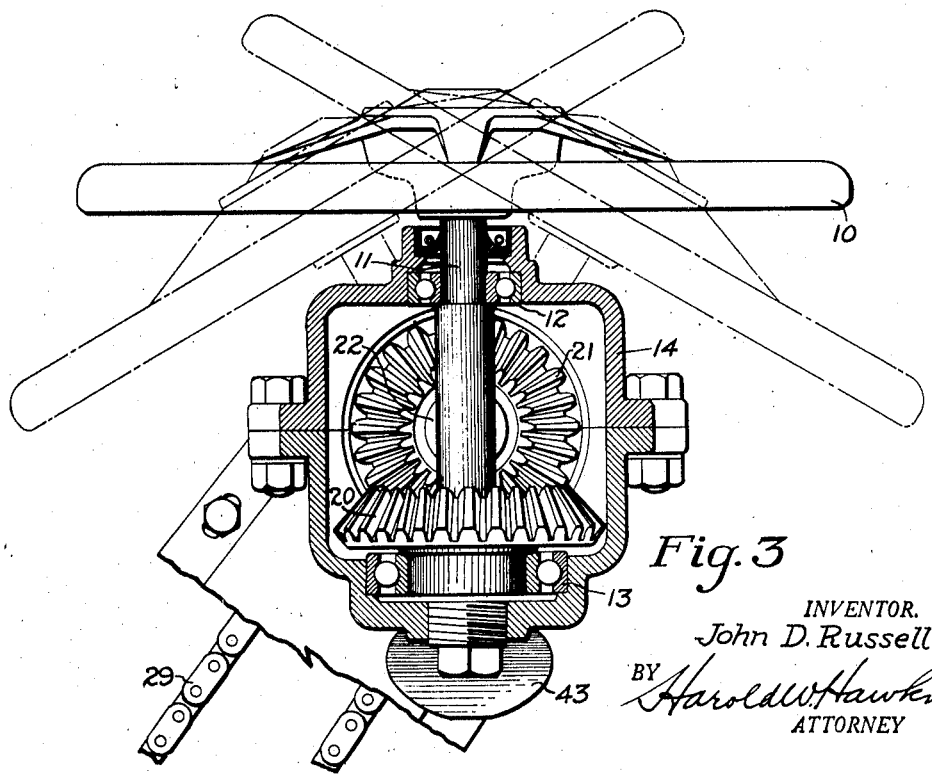
Fig. 3
INVENTOR.
John D. Russell
BY Harold W. Hawkins
ATTORNEY Patented Nov. 3, 1942

2,301,146

UNITED STATES PATENT OFFICE 2,301,146

STEERING MECHANISM

John D. Russell, Sugarcreek Township, Venango County, Pa., assignor to Joy Manufacturing Company, a corporation of Pennsylvania Continuation of application Serial No. 382,927, March 12, 1941. This application May 7, 1941, Serial No. 392,257

3 Claims. (Cl. 74—493)

This invention relates to mechanism for steering self-propelled vehicles, and more particularly to improvements in steering mechanisms for vehicles adapted to be driven without turning in reverse directions, and is a continuation of my pending application Serial No. 382,927, filed March 12, 1941.

Self-propelled vehicles are now being used extensively in confined places or areas such as the rooms and entries of underground or pit mines where it is impossible to turn the vehicle around, and consequently the vehicle travels forward in the normal manner when moving in one direction and backward or in reverse when moving in the opposite direction.

The most common type of self-propelled vehicle used in the coal mines of this country, has a platform on one side of the car on which the operator rides, and steering is accomplished by means of a steering mechanism having a vertically extending column which is mounted in the center of the platform.

As most of the cars now in use have an overall height of 42" or less above the ground, it is apparent that a vertically extending steering column mounted in the center of the operator's platform makes it necessary for the operator to ride in such an extremely cramped position that he has difficulty in properly handling or manipulating the car, which increases materially the risk of injury to the operator and also to others working in or about the path of travel of the vehicle.

The principal object of this invention is to provide a mechanism for steering a self-propelled vehicle, in which the steering column lies in a horizontal plane above the platform, thus providing ample leg room for the operator therebeneath, and in which the steering wheel is rotatable about the column in a vertical plane to permit the wheel to be turned to the proper position for steering when the vehicle is moving in either direction.

Another object is to provide a steering mechanism for a self-propelled vehicle which is easy to install on the vehicle, and when installed is not only positive and simple in operation, but affords the maximum protection for the operator.

These and other objects which will hereinafter be made apparent to those skilled in this particular art, are accomplished by means of this invention, one embodiment of which is described in the following specification and illustrated in the accompanying drawings, wherein:

Fig. 3 is a transverse section taken on line III—III of Fig. 1; and

Fig. 4 is an end view of a self-propelled vehicle equipped with my improved steering control mechanism having portions thereof broken away for convenience of illustration.

Figure 1:
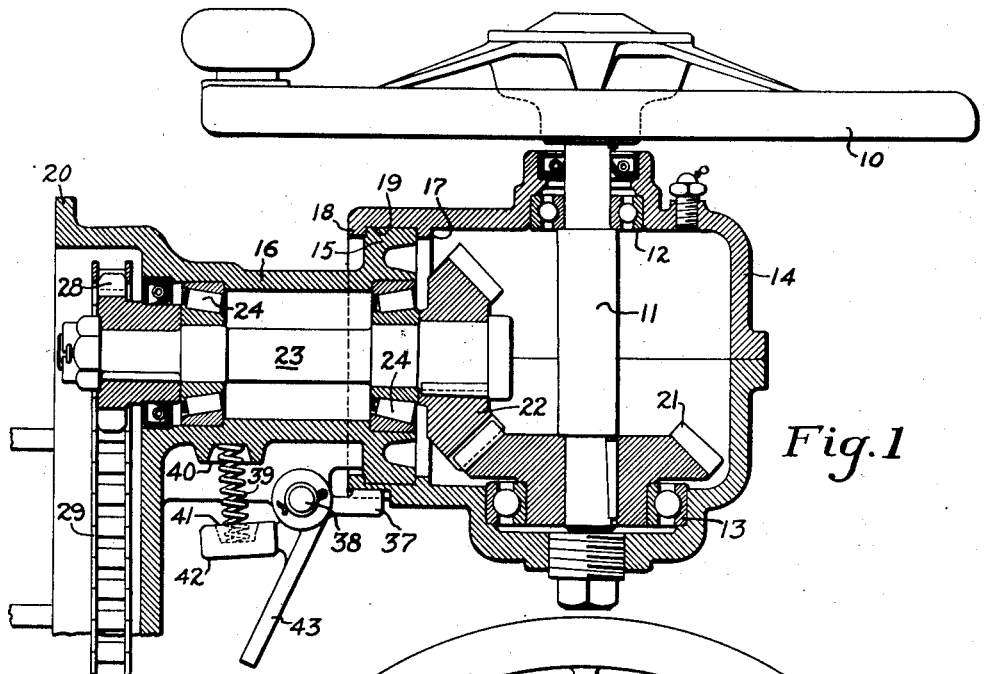
Fig. 1 is a vertical section of a steering control mechanism made in accordance with my invention.
Figure 2:
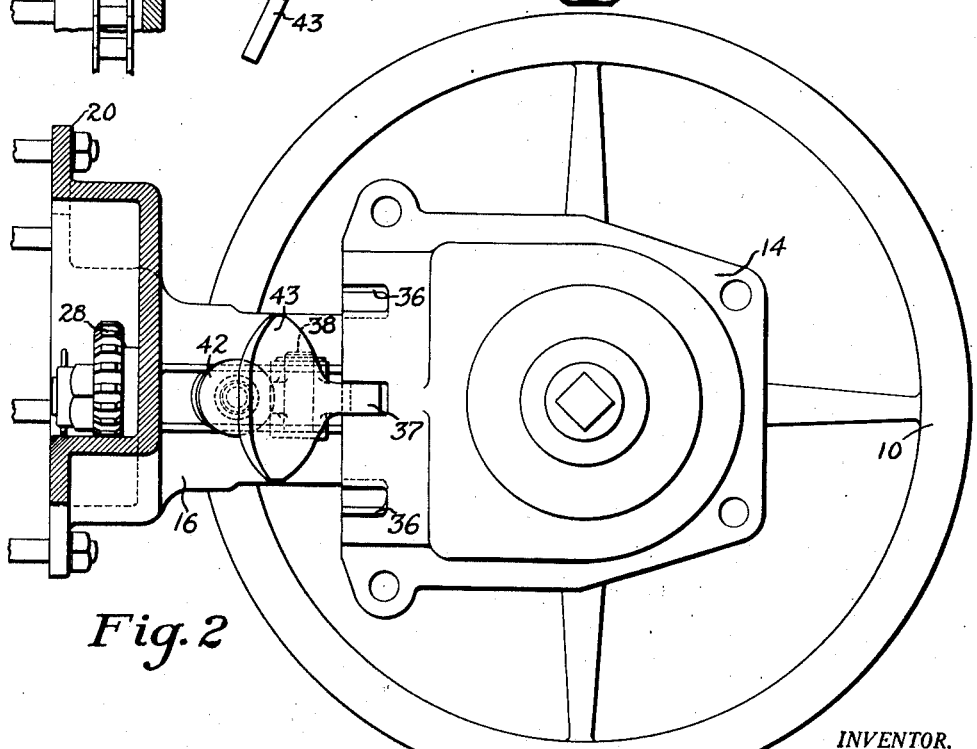
Fig. 2 is a bottom view of the mechanism shown in Fig. 1.

Referring in detail to the drawings, 10 represents a steering wheel mounted on the end of a steering shaft 11, which is rotatably journaled in upper and lower bearings 12 and 13, respectively, mounted in a two-part housing 14. The housing 14 is rotatably mounted on the hub 15 of a hollow post or column 16 for rotation in a plane substantially perpendicular to the major axis of the post. Each section of the housing is provided with an inwardly projecting flange 17 and an annular lip 18 which provides an annular recess 19 therebetween for receiving the hub 15.

The opposite end of the post or column 16 is provided with a flange 20 which, as illustrated in Fig. 4, is adapted to be bolted to the side wall 25 of a vehicle so that it extends outwardly therefrom in a substantially horizontal plane above an operator's platform 26. The vehicle is provided with a set of steerable wheels 27 and in order that the rotation or turning of the steering wheel 10 will be transmitted to the wheels 27 to steer the same, the shaft 11 has a bevel gear 21 secured thereto which meshes with a bevel gear 22 secured to the end of a shaft 23 journaled in bearing 24, mounted in the post or column 16. A sprocket 28 is secured to the inner end of the shaft 23, which is connected by a chain 29 with a sprocket 30 on one end of a horizontal shaft 31. The shaft 31 is journaled in the side walls 25 of the vehicle beneath the floor 32 thereof and provides the main steering shaft of the vehicle. The shaft 31 is provided with the usual steering gear unit 33 which operates a steering knuckle 34, connected to the steering arm 35 of the wheels 27 in the usual manner.

As heretofore stated, the housing 14 is rotatably mounted on the hub 15 of the column or post 16. This construction permits the housing 14 to be turned about the post to position the steering wheel 10 on either side of the column 16, where it is readily accessible to the operator regardless of the direction of travel of the vehicle.

In order to hold the wheel 10 in proper position on either side of the column 16, or directly thereabove, the outer periphery of the housing 14 is provided with a series of slots or notches 36 in which a latch 37, pivoted at 38 to the bottom of the post or column 16, is adapted to be received. The latch 37 is yieldably urged into the slots or notches 36 by a spring 39 having one end disposed in a recess 40 in the bottom of the post 16, and the other end in a recess 41 in lug 42 extending rearwardly from the latch 37. In order that the latch may be easily and readily operated, a lever 43 is secured thereto, which is arranged to extend downwardly from the post 16.

From the foregoing description of my invention it is apparent that I have provided a steering control mechanism for a self-propelled vehicle which is adapted to be mounted on the side of the vehicle, and the column or post 16 supporting the steering wheel 10 extends horizontally and provides an unobstructed space therebeneath which is freely accessible to the operator.

When it is desired to turn the steering wheel 10 from one side of the column 16 to the other, depending on the direction of travel of the car, it is only necessary to press the handle 43 and release the latch 37 from the notch 36, after which the housing 14 may be readily rotated about the hub 15.

Since the latch 37 is continuously urged toward the notches 36, it is obvious that when the steering wheel is moved to the desired position the latch 37 will automatically snap into the notch 36 and lock the housing 14 against further turning on the hub 15. When the housing 14 is rotated about the column 16, the gear 21 rolls around the bevel gear 22, but is never moved out of engagement therewith; consequently the wheels 27 may be steered by turning the wheel 10 and the shaft 11, regardless of the position of the housing 14 on the post 16.

While one illustrative embodiment of my invention has been described, it is not my intention to limit the scope of the invention to any particular embodiment or otherwise than by the terms of the appended claims.

What I claim is:

1. In a steering control mechanism for a vehicle having an operator's station along one side wall thereof, the combination comprising a hollow steering post adapted to be mounted on the side of said vehicle and to extend outwardly therefrom in a substantially horizontal plane, said steering column having an enlarged annular hub at its outer end, a two-part housing mounted on said hub for rotation in a plane substantially perpendicular to the axis of said column, each part of said housing having spaced inwardly projecting flanges to provide a recess therebetween for receiving said hub, and means for locking said housing in fixed relation to said column including a latch pivotally mounted on said column and adapted to seat in one of a series of notches in said housing, and means for yieldably urging said latch into seating engagement with the notches in said housing.

2. In a steering control mechanism for vehicles having an operator's station along one side thereof, the combination comprising a steering post adapted to be secured to the side wall of said vehicle and to project outwardly therefrom, an enlarged annular hub on the outer end of said steering post, a two-part housing carrying a steering wheel rotatably mounted on said hub, each part of said housing having spaced inwardly projecting flanges forming, when said parts are assembled, a circular recess for receiving said hub and means for locking said housing in fixed relation to said post including a latch pivotally mounted on said post and adapted to seat in one of a series of notches in said housing, a lug projecting from said latch, and a spring interposed between said lug and said post for yieldably urging said latch into seating engagement in one of said notches.

3. In a steering control mechanism for vehicles having an operator's station along one side thereof, the combination comprising a steering post adapted to be secured to the side wall of said vehicle and to project outwardly therefrom, an enlarged annular hub on the outer end of said post, a two-part housing carrying a steering wheel rotatably mounted on said hub, and means for locking said housing in fixed relation to said post, including a latch pivotally mounted on said post and adapted to seat in one of a series of notches in said housing on rotation thereof, a lug projecting from said latch, a spring interposed between said lug and said post for yieldably urging said latch into said notches and means for unseating said latch.

JOHN D. RUSSELL.